US012641700B2

(12) United States Patent
Ishiyama et al.

(10) Patent No.: US 12,641,700 B2
(45) Date of Patent: May 26, 2026

(54) PRIORITY CONTROL SYSTEM, PRIORITY CONTROLLER, AND ACTUATOR

(71) Applicant: JIMBO ELECTRIC Co., Ltd., Isumi-gun Chiba (JP)

(72) Inventors: Shingo Ishiyama, Isumi-gun Chiba (JP); Kazuhiro Naito, Isumi-gun Chiba (JP); Tatsuo Matsuno, Isumi-gun Chiba (JP); Yoma Isakawa, Isumi-gun Chiba (JP); Yasuhiro Suichi, Isumi-gun Chiba (JP); Masahiro Fujita, Isumi-gun Chiba (JP)

(73) Assignee: JIMBO ELECTRIC Co., Ltd., Otaki (JP)

( * ) Notice: Subject to any disclaimer, the term of this patent is extended or adjusted under 35 U.S.C. 154(b) by 391 days.

(21) Appl. No.: 18/020,701

(22) PCT Filed: Jul. 29, 2021

(86) PCT No.: PCT/JP2021/028213
§ 371 (c)(1),
(2) Date: Nov. 20, 2023

(87) PCT Pub. No.: WO2022/034804
PCT Pub. Date: Feb. 17, 2022

(65) Prior Publication Data

US 2024/0090106 A1 Mar. 14, 2024

(30) Foreign Application Priority Data

Aug. 11, 2020 (JP) ................................ 2020-136073

(51) Int. Cl.
*H05B 47/175* (2020.01)
*H05B 47/155* (2020.01)
*H05B 47/18* (2020.01)

(52) U.S. Cl.
CPC ......... *H05B 47/175* (2020.01); *H05B 47/155* (2020.01); *H05B 47/183* (2024.01)

(58) Field of Classification Search
CPC ........... H05B 41/2885; H05B 41/2928; H05B 41/3921; H05B 47/155; H05B 47/175; H05B 47/183
See application file for complete search history.

(56) References Cited

U.S. PATENT DOCUMENTS 8,355,713 B1 * 1/2013 Oh ........................ G08C 17/02 455/420
2015/0319827 A1 * 11/2015 Lee ....................... G06V 20/63 315/152

(Continued)

FOREIGN PATENT DOCUMENTS

JP 254897 A 2/1990
JP 2003289528 A 10/2003

(Continued)

OTHER PUBLICATIONS

International Search Report and Written Opinion for PCT Appl. No. PCT/JP2021/028213 mail date Oct. 5, 2021, 13 pages.

(Continued)

*Primary Examiner* — Wei (Victor) Y Chan
(74) *Attorney, Agent, or Firm* — Maine Cernota & Curran

(57) ABSTRACT

This invention is capable of detailed control in accordance with the mode of using a lighting apparatus and the like. A priority control system for an operation target device is provided, the system including: a plurality of operation devices configured to send operation request information to effect of exhibiting a function of an operation target device; a single or plurality of operation target devices configured to receive operation instruction information to effect of exhibiting the function and to exhibit the function in accordance with the operation instruction information; a control device (Continued)

100 configured to receive the operation request information from one of the operation devices, to generate or not to generate the operation instruction information triggered by the reception of the operation request information, and if the operation instruction information is generated, to send the generated operation instruction information to the operation target device; and a communication mechanism configured to communicate the operation request information and the operation instruction information, wherein a specific operation device priority level is set to each operation device, a dynamically variable operation target device priority level is set to the operation target device, and the control device refers to the operation device priority level and the operation target device priority level, and as a result of the reference, generates or does not generate the operation instruction information and retains or updates the operation target device priority level.

18 Claims, 13 Drawing Sheets

(56) References Cited

U.S. PATENT DOCUMENTS

| | | | | |
|---|---|---|---|---|
| 2016/0056629 | A1* | 2/2016 | Baker .................... | H05B 47/11<br>315/307 |
| 2016/0180617 | A1* | 6/2016 | Windridge ............... | G07C 9/32<br>340/5.21 |
| 2016/0323972 | A1* | 11/2016 | Bora .................... | H05B 47/105 |

FOREIGN PATENT DOCUMENTS

| | | | |
|---|---|---|---|
| JP | 2006129098 | A | 5/2006 |
| JP | 201983454 | A | 5/2019 |
| JP | 2002260871 | A | 5/2019 |

OTHER PUBLICATIONS

International Preliminary Report on Patentability for PCT Appl. No. PCT/JP2021/028213 mail date Feb. 23, 2023, 11 pages.

* cited by examiner

140

140

PRIORITY CONTROL SYSTEM, PRIORITY CONTROLLER, AND ACTUATOR

RELATED APPLICATIONS

This application is a national phase application filed under 35 USC § 371 of PCT Application No. PCT/JP2021/028213 with an International filing date of Jul. 29, 2021, which claims priority of JP Patent Application 2020-136073 filed Aug. 11, 2020. Each of these applications is herein incorporated by reference in its entirety for all purposes.

TECHNICAL FIELD

The present invention relates to a priority control system, a priority control device, and an operation device that are applicable to a lighting system and the like.

BACKGROUND ART

For example, PTL 1 discloses an invention related to a lighting control system capable of quickly control a plurality of lighting apparatuses. According to the description, the invention includes: a first lighting apparatus; a second lighting apparatus having a function different from that of the first lighting apparatus; and a controller configured to send a control command to the first lighting apparatus and the second lighting apparatus, wherein the control command contains control information including a plurality of parameters and distinction information indicating whether each of the parameters is valid or invalid, the first lighting apparatus operates, if a first parameter to be reflected in control of the first lighting apparatus among the plurality of parameters is defined as valid by the distinction information, in accordance with the first parameter, and the second lighting apparatus operates, if a second parameter to be reflected in control of the second lighting apparatus among the plurality of parameters is defined as valid by the distinction information, in accordance with the second parameter.

For example, PTL 2 discloses an invention related to a switching device, a system for controlling a lamp, and a light control system for a building comprising at least one light. The invention introduces the concept of the order of priority to the DALI (digital addressable lighting interface)® technology, and the switching device has two inputs and one output where each of the two inputs is connected to one DALI® bus and the output is connected to one DALI® bus. A data processing unit receives a plurality of signals arriving via the two inputs and allocates priorities to the signals on the basis of predetermined criteria, the signals being supplied to the output in dependence on their priority. Thus, the signals are finally forwarded to an electronic ballast. According to the description, the switching device, especially the data processing unit, determines which instruction is to be carried out by providing priorities in the event of collision conflicts between variously different instructions, for example central building control instructions and local control instructions.

For example, PTL 3 discloses an invention related to a method for configuring a device in a lighting system. A configuration system according to the invention comprises: a memory arranged for storing one or more light settings defined by one or more light setting rules; a communication unit arranged for communicating with a first device; and a processor arranged for identifying the device property of the first device based on received from the first device via the communication unit, the processor being arranged for accessing the one or more light settings stored in the memory, and for determining if the device property 132 is compliant with at least one of the one or more light setting rules 112 of at least one of the one or more light settings, if so associating the first device with the one or more light settings, and for storing the association.

For example, PTL 4 discloses a method and a device for granting control of a shared-access system. According to the description, the method comprises: obtaining an identity of a user; obtaining a priority rating associated with the user, wherein the priority rating is updated in response to and based on one or more observed activities of the user, the one or more observed activities being linked to the shared-access system; comparing the priority rating with a threshold; granting control of at least a part of the shared-access system to the user if the priority rating is above the threshold. In addition, each user may have a respective 'strength of association' with the shared-access system or part thereof; the shared-access system may comprise one or more lighting units arranged to illuminate an environment, and a user who is present most often in the environment may be deemed to have the 'strongest association' with the shared-access system.

For example, PTL 5 discloses an invention of a system and a method for providing an alternative communication path for management of illumination network elements that can by-pass a primary communication system and control communication in the luminaires of an illumination network. According to the description, the invention is capable of communicating and controlling network elements by creating the alternative back-up path in cases when the primary communication and control path is unavailable or when direct control of individual or a plurality of luminaries is desired. According to the description, in one aspect of the invention, this alternative path may provide for a direct interface for demand response utility programs for specialized control of the luminaires of the illumination network.

CITATION LIST

Patent Literature

PTL 1: JP 2016-177985 A
PTL 2: JP 2009-544130 A
PTL 3: JP 2018-524777 A
PTL 4: JP 2016-500904 A
PTL 5: JP 2015-527699 A

SUMMARY OF INVENTION

Technical Problem

According to the conventional techniques described in PTLs 1 through 5 above, when a plurality of lighting apparatuses are controlled by a control command, it is possible to normally control the plurality of lighting apparatuses by providing a function of sending a control command to a lighting apparatus having a function compliant with the control command, a function of adjusting a contention if the contention occurs between a plurality of control buses, a plurality of control commands, and a plurality of users, a back-up line in case of a trouble in the communication lines and paths, and the like.

However, the conventional techniques described above are not capable of detailed control in accordance with the mode of using a lighting apparatus, such as intending to differently control operation of a switch to turn on and off the lighting of the entire floor from a switch to turn on and off only a specific lighting area when an office on a floor of a building is divided into a plurality of lighting areas, and intending to invalidate an erroneous operation of turning on a lighting switch that is once turned off when a projector is used during a conference, for example.

It is an object of the present invention to provide a priority control system, a priority control device, and an operation device that are capable of detailed control in accordance with the mode of using a lighting apparatus and the like.

Solution to Problem

To solve the above problems, a first aspect of the present invention provides a priority control system for an operation target device, including: a plurality of operation devices configured to send operation request information to effect of exhibiting a function of an operation target device; a single or plurality of operation target devices configured to receive operation instruction information to effect of exhibiting the function and to exhibit the function in accordance with the operation instruction information; a control device configured to receive the operation request information from one of the operation devices, to generate or not to generate the operation instruction information triggered by the reception of the operation request information, and if the operation instruction information is generated, to send the generated operation instruction information to the operation target device; and a communication mechanism configured to communicate the operation request information and the operation instruction information, wherein a specific operation device priority level is set to each operation device, a dynamically variable operation target device priority level is set to the operation target device, and the control device refers to the operation device priority level and the operation target device priority level, and as a result of the reference, generates or does not generate the operation instruction information and retains or updates the operation target device priority level.

The control device may determine whether the operation target device priority level is higher than the operation device priority level in response to the reception of the operation request information, and if the determination is true, does not generate the operation instruction information and retains the operation target device priority level. In this case, the control device may determine, in response to the reception of the operation request information, whether the operation request information is information to the effect of starting the function and whether the operation target device priority level is the operation device priority level or less, and if the determination is true, generates the operation instruction information to effect of starting the function and updates the operation target device priority level to the operation device priority level. As another example in this case, the control device may determine, in response to the reception of the operation request information, whether the operation request information is information to effect of stopping and whether the operation target device priority level is the operation device priority level or less, and if the determination is true, generates the operation instruction information to effect of stopping the function and updates the operation target device priority level to a lowest level. As still another example in this case, the control device may determine, in response to the reception of the operation request information, whether the operation request information is information to effect of stopping the function and also maintaining the priority level and whether the operation target device priority level is the operation device priority level or less, and if the determination is true, generates the operation instruction information to effect of stopping the function and updates the operation target device priority level to the operation device priority level.

Each operation device may have a reporting section configured to report that the operation device is in an operation lock state where operation is ignored, the control device may determine whether the operation target device priority level is higher than the operation device priority level in response to the reception of the operation request information, and if the determination is true, does not generate the operation instruction information and sends operation lock information to effect of not generating the operation instruction information back to the operation device having sent the operation request information, and the reporting section may report that the operation device is in the operation lock state when the operation device receives the operation lock information. In this case, while the reporting section of the operation device reports that the operation device is in the operation lock state, the operation device may send the operation request information containing information to effect of releasing the operation lock state to the control device in response to an input to effect of releasing the operation lock state, and the control device may generate the operation instruction information to effect of reversing a current state of the function in response to the reception of the operation request information. Further in this case, the operation target device priority level may be updated to the operation device priority level if the operation instruction information is to effect of starting the function, and the operation target device priority level may be updated to a lowest level if the operation instruction information is to effect of stopping the function.

The priority control system may have any configuration of: a first configuration in which each operation device has a storage section configured to store the operation device priority level, each storage section stores the operation device priority level specific to the operation device, the operation target device has a storage section configured to store the operation target device priority level, and the operation target device priority level is stored and updated in the storage section; a second configuration in which each operation device has a storage section configured to store the operation device priority level, each storage section stores the operation device priority level specific to the operation device, the control device has a storage section configured to store the operation target device priority level, and the operation target device priority level is stored and updated in the storage section; a third configuration in which the control device has a storage section configured to store each operation device priority level, the storage section stores the operation device priority level specific to each operation device, the operation target device has a storage section configured to store the operation target device priority level, and the operation target device priority level is stored and updated in the storage section; and a fourth configuration in which the control device has a storage section configured to store each operation device priority level and the operation target device priority level, the storage section stores the operation device priority level specific to each operation device, and the operation target device priority level is stored and updated in the storage section.

An attribute code classified by an installation location, an intended use, and another attribute, in addition to the operation device priority level, of each operation device may be set to the operation device, and the control device may refer to the operation target device priority level and a combination of the attribute code with the operation device priority level, and as a result of the reference, generates or does not generate the operation instruction information and retains or updates the operation target device priority level.

The operation target device may be a lighting device, the operation devices may be remote operation devices for the lighting device, and the operation request information and the operation instruction information may be configured with a command in accordance with DALI (digital addressable lighting interface)® standard.

A second aspect of the present invention provides a priority control device for an operation target device, including: a receiving section configured to receive operation request information to effect of causing a single or plurality of operation target devices to exhibit a function from a plurality of operation devices; a sending section configured to send operation instruction information to effect of exhibiting the function to the operation target device; a priority level acquisition section configured to acquire an operation device priority level specifically set to each operation device and a dynamically variable operation target device priority level set to the operation target device; and a control section configured to refer to the operation device priority level of an operation device originating the operation request information and the operation target device priority level of a destination operation target device for the operation request information triggered by the reception of the operation request information, and as a result of the reference, to generate or not to generate the operation instruction information and to retain or update the operation target device priority level.

In the above priority control device, the priority level acquisition section may have any configuration of: a first configuration to read and acquire each operation device priority level and the operation target device priority level from a storage section provided in the priority control device; a second configuration to read each operation device priority level from the storage section and to acquire the operation target device priority level from the operation target device via a communication mechanism; a third configuration to acquire the operation device priority level from each operation device via the communication mechanism and to read and acquire the operation target device priority level from the storage section; and a fourth configuration to acquire the operation device priority level from each operation device via the communication mechanism and to acquire the operation target device priority level from the operation target device via the communication mechanism.

An attribute code classified by an installation location, an intended use, and another attribute, in addition to the operation device priority level, of each operation device may be set to the operation device, and the control section may refer to, triggered by the reception of the operation request information, the attribute code and the operation device priority level of the operation device originating the operation request information and the operation target device priority level of the destination operation target device for the operation request information, and as a result of the reference, generate or not generate the operation instruction information and retains or updates the operation target device priority level.

The operation target device may be a lighting device, the operation devices may be remote operation devices for the lighting device, and the operation request information and the operation instruction information may be configured with a command in accordance with DALI (digital addressable lighting interface)® standard.

A third aspect of the present invention provides an operation device, including: an operation section; a reporting section configured to perform light emission display, image display, sound generation, vibration generation, or another report; an operation request information generation section configured to generate operation request information to effect of causing an operation target device to exhibit a function of the operation target device triggered by operation of the operation section; a sending section configured to send the operation request information; a receiving section configured to receive response information to respond to the operation request information or control information sent from a control device having received the operation request information; and a control section configured to control the reporting section based on report control information contained in the response information or the control information.

The operation device may further include a storage section including a reporting pattern storage section configured to store a single or plurality of reporting patterns and an index storage section configured to store an index associated with each reporting pattern, wherein the control section may generate the index referring to the report control information if the receiving section has received the response information or the control information, may write the index in the index storage section, and may control the reporting section in accordance with the reporting pattern associated with the index stored in the index storage section. In this case, if the response information contains operation lock information to effect of not exhibiting the function of the operation target device, the control section may control the reporting section to report that the operation device is in an operation lock state where the operation is ignored. Further in this case, while the reporting section reports that the operation device is in the operation lock state, the operation request information generation section may generate the operation request information containing information to effect of releasing the operation lock state in response to operation of the operation section to effect of releasing the operation lock state. Still in these cases, the operation device may be capable of remote operation for a lighting device, the operation target device may be a lighting device, and the operation request information, the response information, and the control information may be configured with a command in accordance with DALI (digital addressable lighting interface)® standard.

It should be noted that Summary of Invention described above does not list all the characteristics necessary for the present invention. Sub-combinations of these characteristic groups may also be included in the invention.

DESCRIPTION OF EMBODIMENTS

The present invention is described below by way of embodiments of the invention while the following embodiments do not limit the invention defined by the appended claims. In addition, not all the combinations of the characteristics described in the embodiments have to be essential to the solution of the invention.

Figure 1:
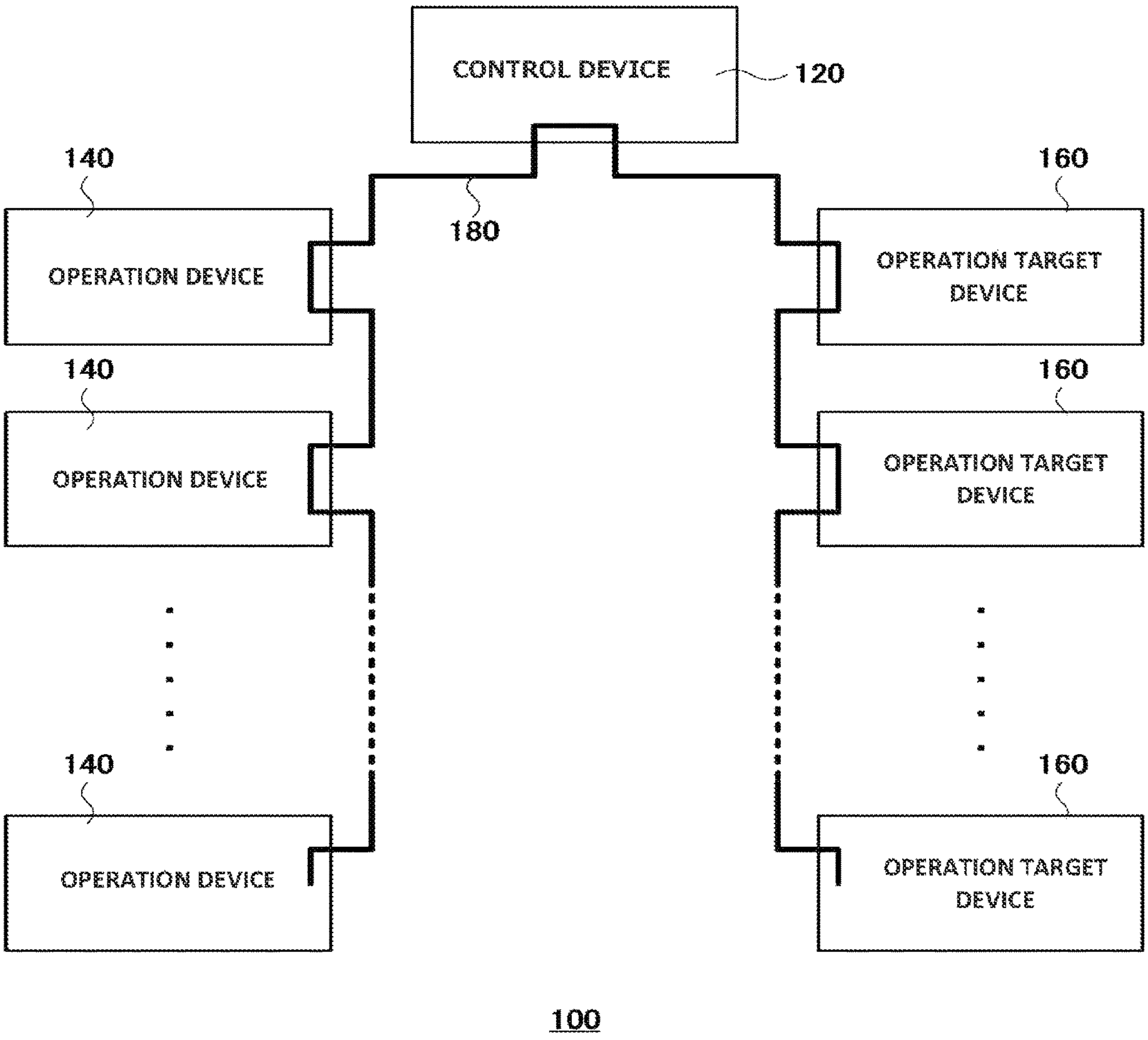
FIG. 1 is a block diagram illustrating the entire priority control system 100.

FIG. 1 is a block diagram illustrating the entire priority control system 100. The priority control system 100 has a control device 120, a plurality of operation devices 140, a single or plurality of operation target devices 160, and a communication mechanism 180. Although FIG. 1 illustrates a plurality of operation target devices 160, the operation target device 160 may be single. In addition, although FIG. 1 illustrates the single control device 120, the control device 120 may include a plurality of the control device 120 as long as the plurality of control devices 120 function in cooperation with each other.

The operation devices 140 send operation request information to the effect of exhibiting a function of the operation target device 160, and the control device 120 generates or does not generate operation instruction information triggered by the reception of the operation request information from one of the operation devices 140, and if the operation instruction information is generated, sends the generated operation instruction information to the operation target device 160. The operation target device 160 receives the operation instruction information and exhibits the function in accordance with the operation instruction information. The communication mechanism 180 communicates the operation request information and the operation instruction information.

In the priority control system 100, a specific operation device priority level is set to each operation device 140, and a dynamically variable operation target device priority level is set to the operation target device 160. Then, the control device 120 refers to the operation device priority level and the operation target device priority level, and as a result of the reference, generates or does not generate operation instruction information and retains or updates the operation target device priority level.

The setting of the operation device priority level to each operation device 140, the setting of the operation target device priority level to the operation target device 160, and the generation or non-generation of operation instruction information referring to the operation device priority level and the operation target device priority level allow control of the operation target device 160 in accordance with these priority levels. The retention or update of the operation target device priority level allows dynamic control in accordance with the situation and allows complex control adapting the mode of use of a user.

If the operation target device 160 is a lighting device, the priority control system 100 may employ the DALI (digital addressable lighting interface)® standard as the standard to be adhered to. The adherence to the DALI® standard allows provision of the operation devices 140 and the control device 120 that widely supports the operation target device 160 employing the standard. The adherence also allows complex control and reporting in the operation devices 140 and the operation target device 160 using control commands employed by the DALI® standard. This allows a user to freely select the operation target device 160 in accordance with the DALI® standard regardless of the manufacturer and the realization of complex control allows an increase in the convenience of users.

Figure 2:
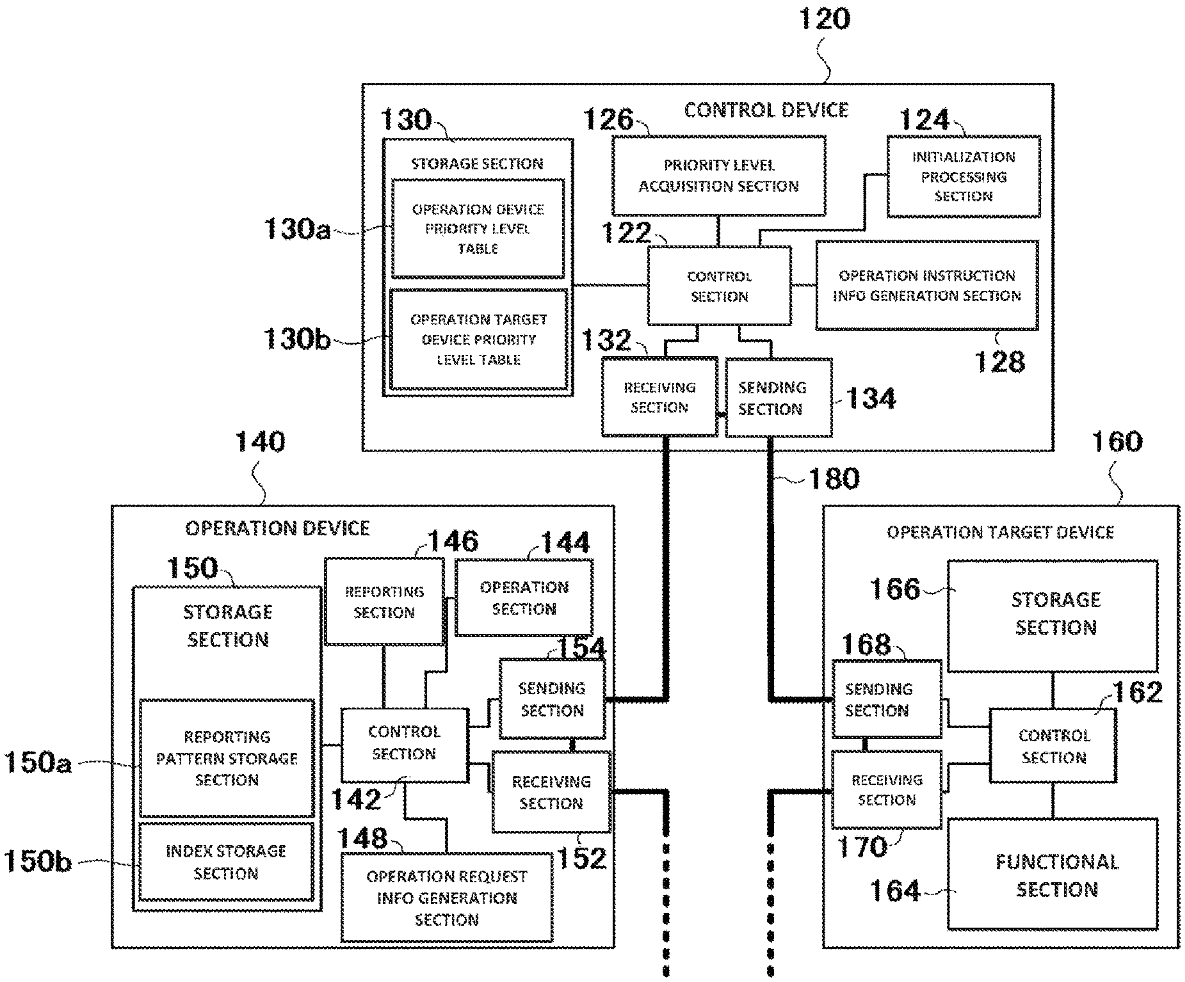
FIG. 2 is a functional block diagram illustrating the main configuration of the priority control system 100.

FIG. 2 is a functional block diagram illustrating main components of the priority control system 100. The control device 120 has a control section 122, an initialization processing section 124, a priority level acquisition section 126, an operation instruction information generation section 128, a storage section 130, a receiving section 132, and a sending section 134. The storage section 130 stores an operation device priority level table 130*a* and an operation target device priority level table 130*b*.

The control section 122 controls the control device 120 to exhibit a predetermined function. The initialization processing section 124 performs initialization process of the entire priority control system 100. The priority level acquisition section 126 acquires the operation device priority level and the operation target device priority level stored in the storage section 130. The operation instruction information generation section 128 generates operation instruction information referring to the operation device priority level and the operation target device priority level acquired by the priority level acquisition section 126. The operation device priority level for each operation device is recorded in the operation device priority level table 130*a*, and the operation target device priority level for each operation target device is recorded in the operation target device priority level table 130*b*. The storage section 130 also stores a control program for the control device 120 and other data. The receiving section 132 receives the operation request information from each operation device 140 and response information from the operation target device 160. The sending section 134 sends operation instruction information to the operation target device 160 and sends the response information or control information from the operation target device 160 to the operation devices 140.

Each operation device 140 has a control section 142, an operation section 144, a reporting section 146, an operation request information generation section 148, a storage section 150, a receiving section 152, and a sending section 154. The storage section 150 has a reporting pattern storage section 150*a* and an index storage section 150*b*.

The control section 142 controls the operation devices 140 to exhibit a predetermined function. The operation section 144 is subjected to operation by a user. Examples of the operation section 144 include a switch, a rotary encoder, and the like, for example. The reporting section 146 executes reporting based on report control information from the control section 122. Examples of the reporting section 146 include an LED, an RGB_LED, a liquid crystal display device, a sound generation device, and the like, for example.

The operation request information generation section 148 generates operation request information upon the reception of a signal from the operation section 144. The storage section 150 has the reporting pattern storage section 150*a* and the index storage section 150*b*, where the reporting pattern storage section 150*a* stores a reporting pattern in the reporting section 146 and the index storage section 150*b* stores an index associated with each reporting pattern. The storage section 150 also stores a control program for the operation devices 140 and other data. The receiving section 152 receives the response information or the control information from the control device 120 and the sending section 154 sends the operation request information to the control device 120.

The operation target device 160 has a control section 162, a functional section 164, a storage section 166, a sending section 168, and a receiving section 170.

The control section 162 controls the operation target device 160 to exhibit a predetermined function. The functional section 164 exhibits a function of the operation target device 160. If the operation target device 160 is a lighting device, the functional section 164 may be exemplified by a light emitting section, such as a lamp. The storage section 166 stores a control program for the operation target device 160 and other data. The receiving section 170 receives the operation instruction information from the control device 120 and the sending section 168 sends the response information to the control device 120.

Figure 3:
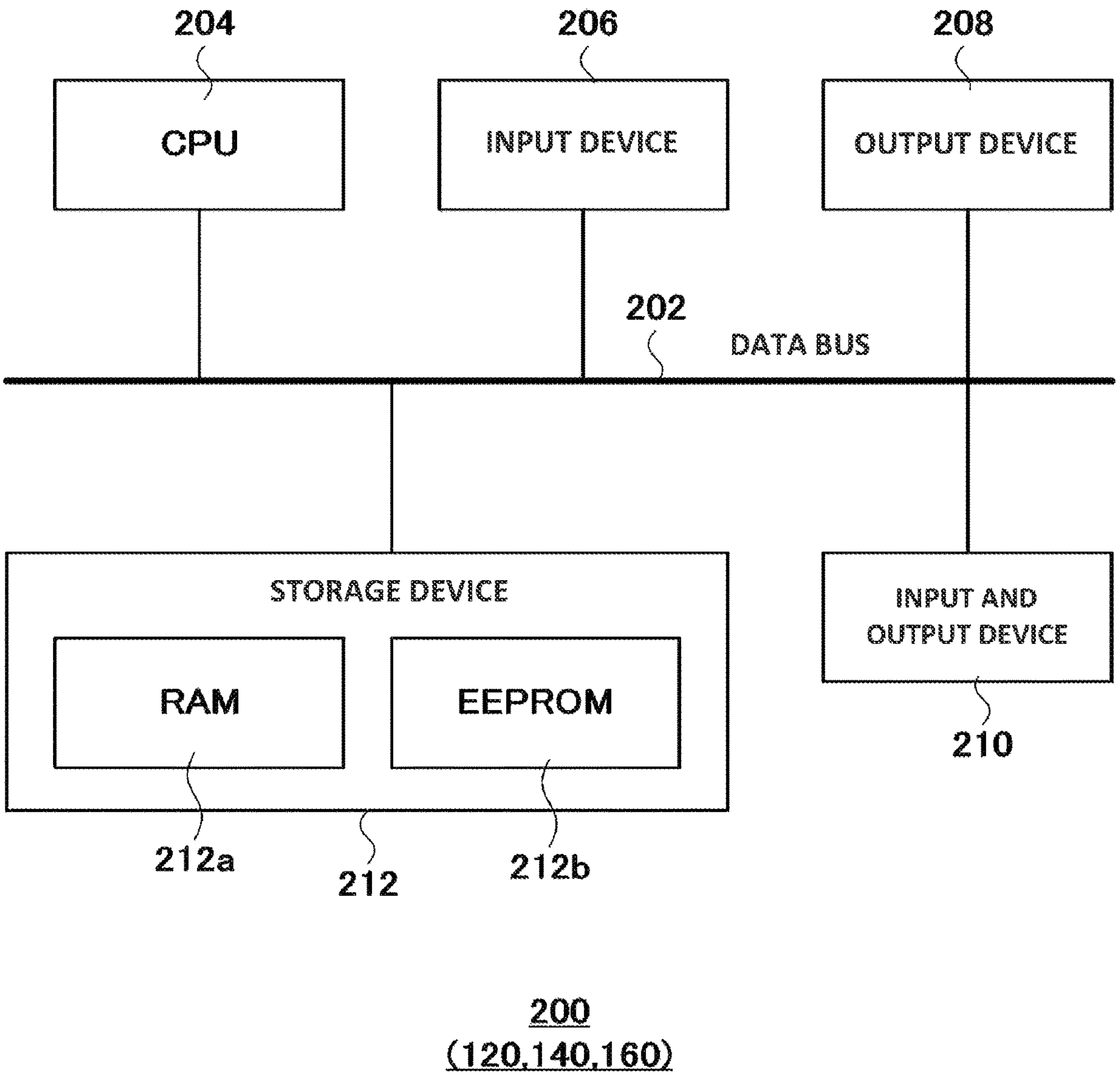
FIG. 3 is a schematic diagram illustrating an example of hardware 200 used in the priority control system 100.

FIG. 3 is a schematic diagram illustrating an example of hardware 200 used in the priority control system 100. The hardware configuration illustrated in FIG. 3 is the same as general computer systems and is applicable to each of the control device 120, the operation devices 140, and the operation target device 160. In the hardware configuration, a CPU (central processing unit) 204, an input device 206, an output device 208, an input and output device 210, and a storage device 212 are connected to a data bus 202. The storage device 212 includes a RAM (random access memory) 212*a* and an EEPROM (electrically erasable programmable read-only memory) 212*b*. It should be noted that the exemplified hardware configuration is merely an example and may be another configuration.

Figure 4:
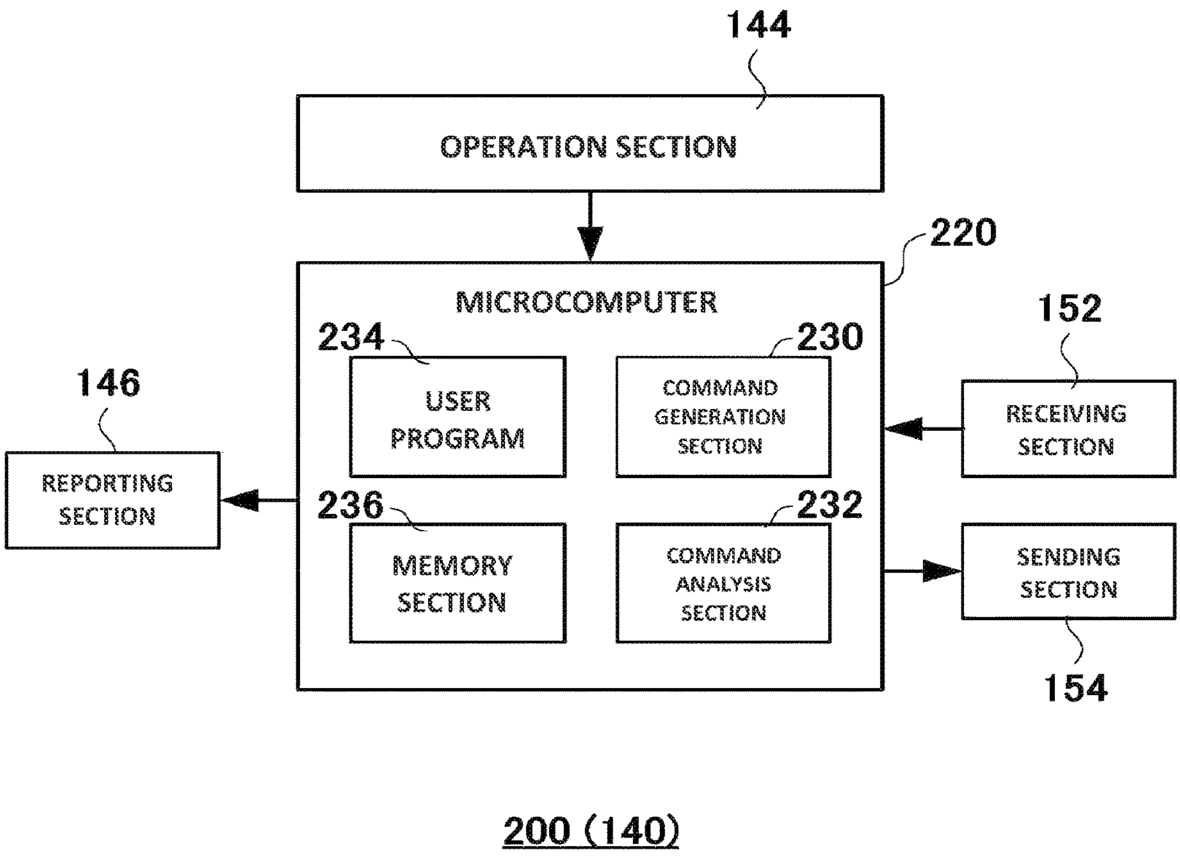
FIG. 4 is a functional block diagram illustrating an example in the case of applying the hardware 200 to an operation device 140.

FIG. 4 is a functional block diagram illustrating an example in the case of applying the hardware 200 to each operation device 140. The operation section 144, the reporting section 146, the receiving section 152, and the sending section 154 are as described earlier. A microcomputer 220 has a command generation section 230, a command analysis section 232, a user program 234, and a memory section 236.

The operation section 144 is an example of the input device 206 to input an operation result to the microcomputer 220. The reporting section 146 is an example of the output device 208 to perform display controlled by the microcomputer 220. The receiving section 152 and the sending section 154 are an example of the input and output device 210 to receive and send the operation request information, the response information, and the like with the control device 120. The functions of the command generation section 230 and the command analysis section 232 are mainly realized by the CPU 204 and the user program 234, where the command generation section 230 generates a command (operation request information) in accordance with operation of the operation section 144 and the command analysis section 232 analyzes and executes a command received from the control device 120. The user program 234 is software to realize the function of the operation device 140 to be stored in the storage device 212. The memory section 236 is an example of the storage device 212 to store a reporting pattern and the like.

Figure 5:
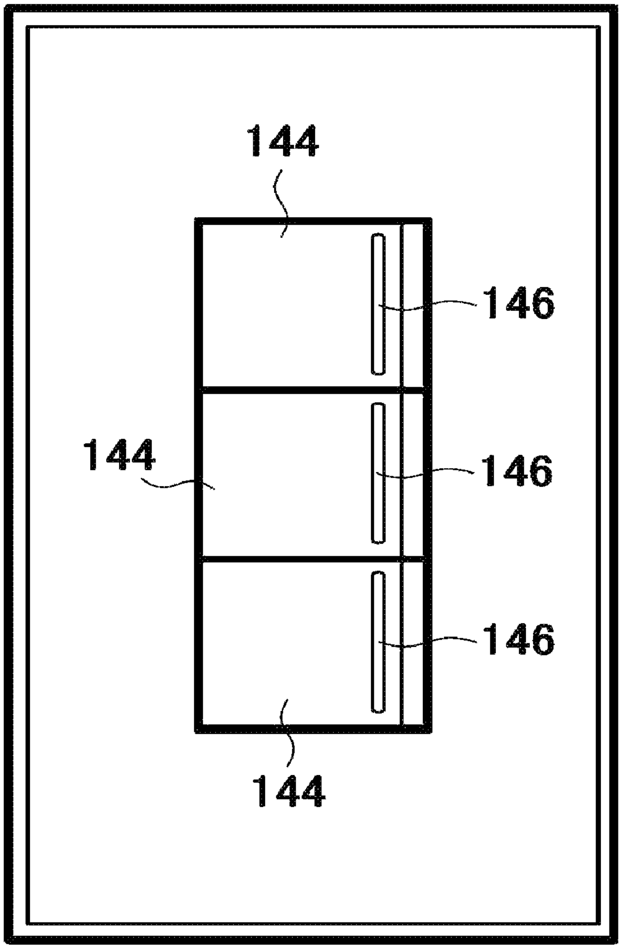
FIG. 5 is a diagram illustrating an example of the appearance of the operation device 140.
Figure 6:
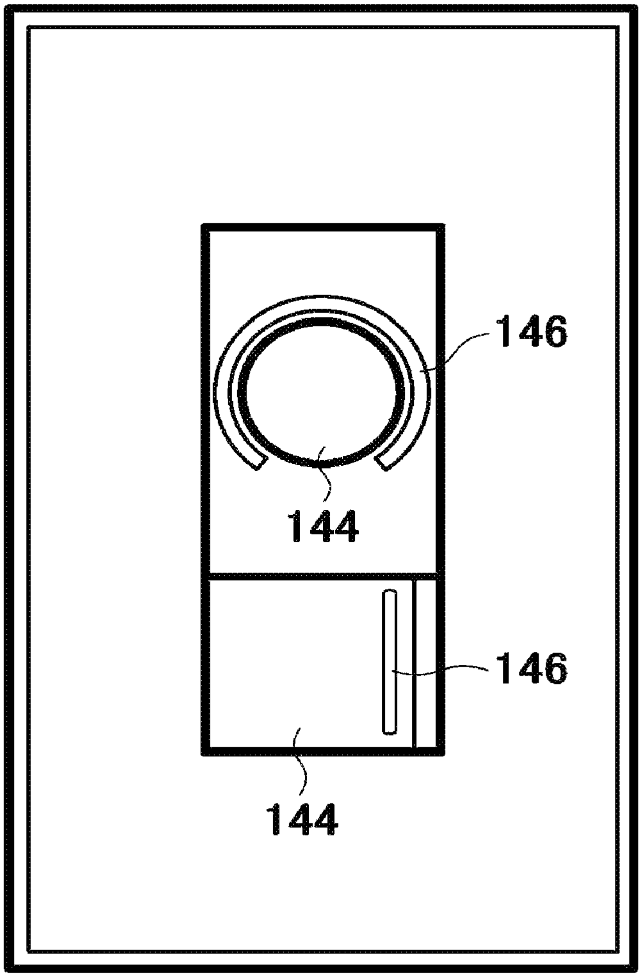
FIG. 6 is a diagram illustrating another example of the appearance of the operation device 140.

FIGS. 5 and 6 are diagrams illustrating examples of the appearance of each operation device 140. The operation device 140 illustrated in FIG. 5 is an example of arranging three rocker switches (tumbler switches) side by side as the operation section 144. Each rocker switch is a momentary contact type and has an LED embedded as the reporting section 146. The LED is capable of reporting the operation state of the operation target device 160 by its lighting, blinking, or a blinking pattern. The LED may be an RGB_LED to differentiate the reporting content by the color of the RGB_LED.

The operation device 140 illustrated in FIG. 6 is an example of combining one rocker switch with a rotary encoder as the operation section 144. The rocker switch is the same as that in the case of FIG. 5. On the outer periphery of the rotary encoder, an arc LED or RGB_LED is arranged as the reporting section 146. For example, the operation state (e.g., output ratio (brightness) of the lighting device) of the operation target device 160 may be displayed by the lighting ratio on the arc of the LED and the lighting ratio and the color on the arc of the RGB_LED.

It should be noted that, if the operation devices 140 are in accordance with the DALI® standard, the reporting pattern (in the case of the above case, the lighting pattern of the LED or the lighting ratio or the color of the RGB_LED) of the reporting section 146 may be specified by definition of the memory domain (bank domain) of the memory section 236. That is, the reporting pattern may be registered in a predetermined bank domain in advance to execute intended reporting (display) in actual reporting by defining the bank domain in which the reporting pattern intended to be displayed is registered.

Figure 7:
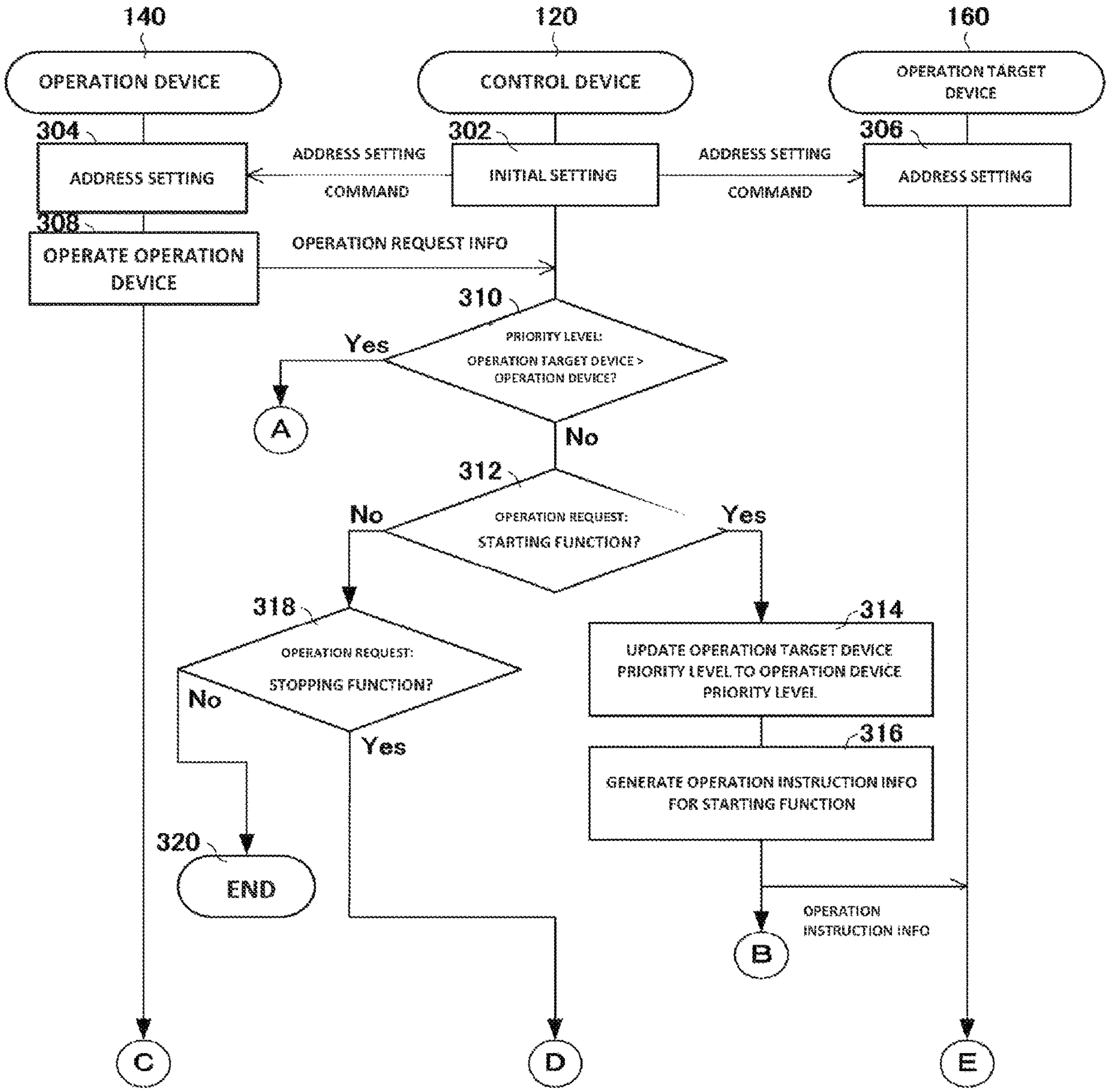
FIG. 7 is a flowchart illustrating an example of behavior of the priority control system 100.
Figure 8:
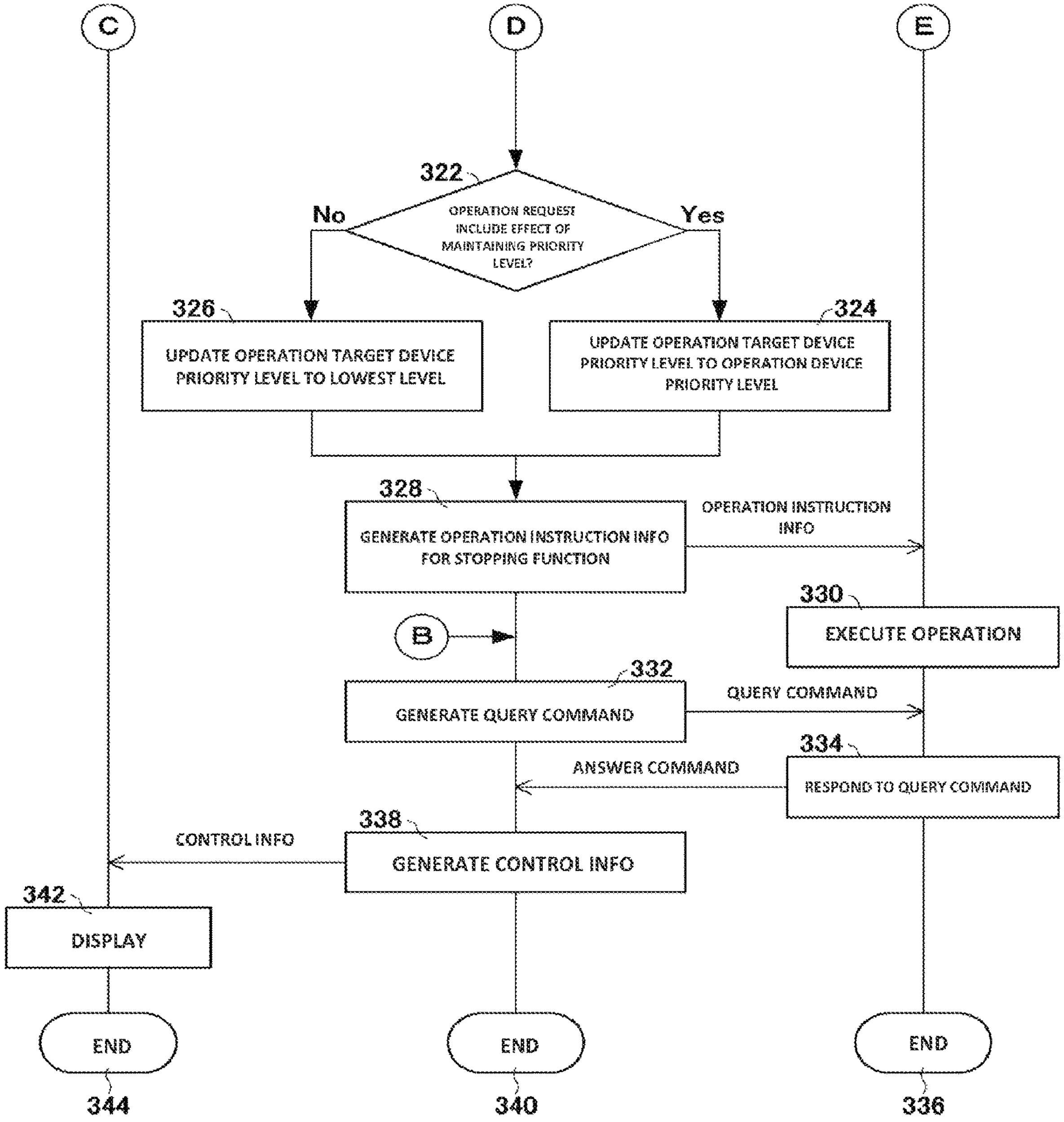
FIG. 8 is a flowchart illustrating an example of behavior of the priority control system 100.
Figure 9:
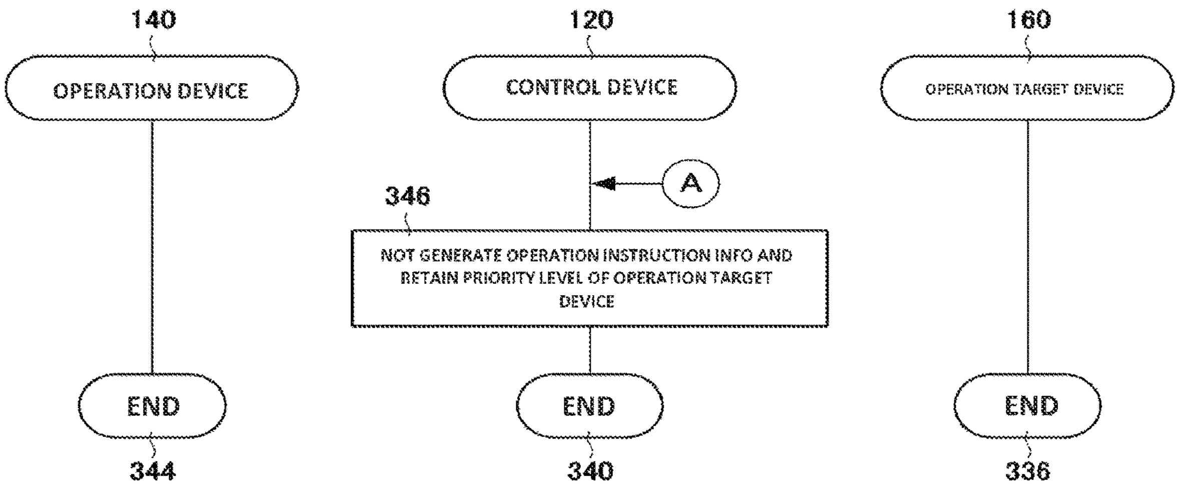
FIG. 9 is a flowchart illustrating an example of behavior of the priority control system 100.

Then, the behavior of the priority control system 100 is described. FIGS. 7 through 9 are flowcharts illustrating examples of the behavior of the priority control system 100.

Upon starting or restarting of the priority control system 100, the control device 120 performs initial setting (step 302). In the initial setting, the control device 120 sends an address setting command to each of the operation devices 140 and the operation target device 160 and each of the operation devices 140 and the operation target device 160 perform address setting in accordance with the received address setting command (steps 304, 306). It should be noted that, in the initial setting, the lowest level (e.g., "0") is allocated as the initial value to the priority level (operation target device priority level) of the operation target device 160. Thus, in the first operation of the operation device 140, the highest priority basically is put on the operation device 140, causing the function of the operation target device 160 to be started or stopped.

When a user operates the operation section 144 in any of the operation devices 140, the operation device 140 generates operation request information and sends the information to the control device 120 (step 308). The control device 120 having received the operation request information compares the operation target device priority level of the subject with the operation device priority level of the request originator in response to the reception of the operation request information and determines whether the operation target device priority level is higher than the operation device priority level (step 310). If the determination is true (i.e., if the higher priority is put on the operation target device 160), the control device 120 does not generate operation instruction information and retains the operation target device priority level (step 346) to terminate the process (step 340).

Figure 10:
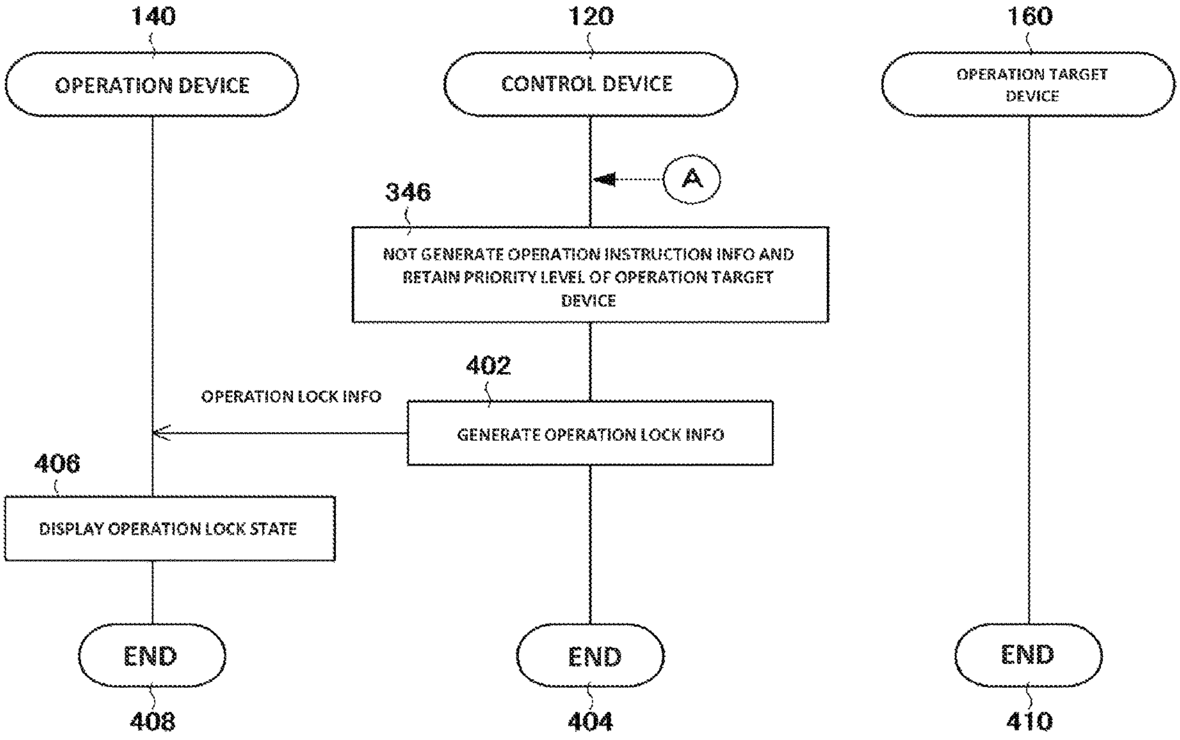
FIG. 10 is a flowchart illustrating an example of behavior of the priority control system 100.

It should be noted that, if the higher priority is put on the operation target device 160 (i.e., if operation of the operation device 140 is invalid), as illustrated in FIG. 10, the control device 120 may generate operation lock information indicating that the operation is in the locked state (step 402) and send the information to the operation device 140. The operation device 140 having received the operation lock information may display that the operation device is in an operation lock state on the reporting section 146 (step 406).

If the determination in step 310 above is false (if the operation target device priority level is the operation device priority level or less, i.e., if the higher priority is put on the operation device 140), the control device 120 determines whether the operation request information is information to the effect of starting a function of the operation target device (step 312), and if the determination is true, updates the operation target device priority level to the operation device priority level (step 314) and also generates operation instruction information to the effect of starting the function (step 316) and sends the information to the operation target device 160. The operation target device 160 having received the operation instruction information executes the operation in accordance with the operation instruction information (step 330). Meanwhile, the control device 120 after sending the operation instruction information generates a query command to inquire the state of the operation target device 160 to the operation target device 160 (step 332) and sends the command to the operation target device 160. The operation target device 160 having received the query command generates an answer command to respond to the query command and sends the command to the control device 120 (step 334) to terminate the process (step 336). The control device 120 having received the answer command generates control information to reflect the answer command (step 338) and sends the information to the operation device 140 to terminate the process (step 340). The operation devices 140 having received the control information controls the reporting section 146 in accordance with the received control information and realizes the display (step 342), and then terminates the process (step 344).

If the determination in step 312 is false, the control device 120 determines whether the operation request information is information to the effect of stopping the function of the operation target device (step 318), and if the determination in is false, terminates the process (step 320). If the determination in step 318 is true, the control device 120 determines whether the operation request information is information including the effect of maintaining the priority level (step 322), and updates the priority level of the operation target device to the priority level of the operation device if the determination is true or updates the priority level of the operation target device to the lowest level if the determination is false, and goes on to step 328. At step 328, the control device 120 generates operation instruction information to the effect of stopping the function of the operation target device (step 316) and sends the information to the operation target device 160. The process at step 330 and later is as described earlier.

The above process is summarized as follows. That is, the process executed by the comparison between the priority level (operation device priority level) of the operation device 140 (e.g., switch for lighting) and the priority level (operation target device priority level) of the operation target device 160 (e.g., lighting device), the determination of whether the operation request is starting or stopping of the function, and the determination of whether the operation request contains maintenance of the priority level is classified into as below.

(1) If the higher priority is put on the operation target device (lighting device), an operation instruction to the operation target device (lighting apparatus) is not issued (the state of lighting or light-out of the lighting apparatus is maintained as the original state) and the priority level of the operation target device (lighting apparatus) is not changed. If the operation device (switch) is provided with the reporting section, it is possible to display that the operation device is in the operation lock state.

(2) If the higher priority is put on the operation device (switch) and the operation request is starting (lighting) of the operation target device (lighting apparatus), an operation instruction of starting the operation target device (lighting apparatus) is issued (the lighting apparatus is lit) and the priority level of the operation target device (lighting apparatus) is updated to the priority level of the operation device (switch).

(3) If the higher priority is put on the operation device (switch) and the operation request is stopping (light out) of the operation target device (lighting apparatus) and does not contain the effect of maintaining the priority level, an operation instruction of stopping the operation target device (lighting apparatus) is issued (the lighting apparatus is lit out) and the priority level of the operation target device (lighting apparatus) is updated to the lowest level.

(4) If the higher priority is put on the operation device (switch) and the operation request is stopping (light out) of the operation target device (lighting apparatus) and contains the effect of maintaining the priority level, an operation instruction of stopping the operation target device (lighting apparatus) is issued (the lighting apparatus is lit out) and the priority level of the operation target device (lighting apparatus) is updated to the priority level of the operation device (switch).

The process as just described allows appropriate setting of the operation device priority level and the operation target device priority level in accordance with the mode of use of a user to increase the convenience of the user. In addition, the operation device priority level and the operation target device priority level may be readily changed, and it is thus possible to flexibly cope with a change even when the mode of use of a user is changed.

For example, given a general office floor, floor switches (operation devices) are installed near an entrance of the floor to turn on and off lighting devices (operation target devices) of the entire floor or some areas of the floor divided into each department or the like and an area switch to turn on and off each lighting device only for a specific area, such as a meeting space, on the floor is installed near the specific area, in some cases. In such a case, by setting the priority level of the floor switch low (e.g., "1") and the priority level of the area switch high (e.g., "2"), the lighting of the specific area may be controlled not to be turned off even when the floor switch is turned off.

That is, all the priority levels of the lighting devices after initialization are "0", and when the first person who entered the room turns on the floor switch, all the lighting on the floor is lit and the priority levels of all the lighting apparatuses are updated to "1" (process of (2) above). If the floor switch is turned off in this state, the switch operation is valid because the priority levels of all the lighting apparatuses on the floor is "1", which is the same as the priority level of the floor switch, and all the lighting on the floor is lit out and the priority levels of all the lighting apparatuses are updated to "0" (process of (3) above). In contrast, when a user of a specific area turns on the area switch, the lighting apparatus in the specific area is lit and also the priority level of the lighting apparatus is updated to "2", and even if the floor switch is turned off in this state, operation of the floor switch is invalid to the lighting apparatus in the specific area and the light is not out because the priority level of the lighting apparatus in the specific area is "2", which is greater than the priority level of the floor switch (process of (1) above). This is convenient in the case that there are persons only in the specific area and it is intended to maintain the lighting only of the specific area and to turn off the lighting in the other areas at once.

As another example, given a situation where presentation is performed using a projector in a darkened room of a conference room or the like, a handy switch to be operated by a presenter is sometimes provided in addition to an in-room switch provided near an entrance and the like of the conference room. In such a case, by setting the priority level of the in-room switch low (e.g., "1") and the priority level of the handy switch high (e.g., "2") and by defining operation of the in-room switch as operation of maintaining the priority level, it is possible to maintain the darkness in the room without turning on the lighting in the room even when the in-room switch is erroneously turned on during the presentation.

That is, if a presenter turns off the lighting in the conference room with the handy switch, the priority level of the in-room lighting apparatus is not "0" but is updated to "2", which is the priority level of the handy switch (process of (4) above). Even when the in-room switch is turned on in this state, the priority level of the in-room switch is "1", which is lower than the priority level of the lighting apparatus, and thus the operation of the in-room switch is invalid and the lighting is not turned on (process of (1) above). It is thus possible to prevent interruption of the presentation and the like due to erroneous operation of the in-room switch.

As just described, the priority control system 100 in the present embodiment allows flexible management of lighting and the like in accordance with the mode of use of users and is capable of providing high convenience to users.

Figure 11:
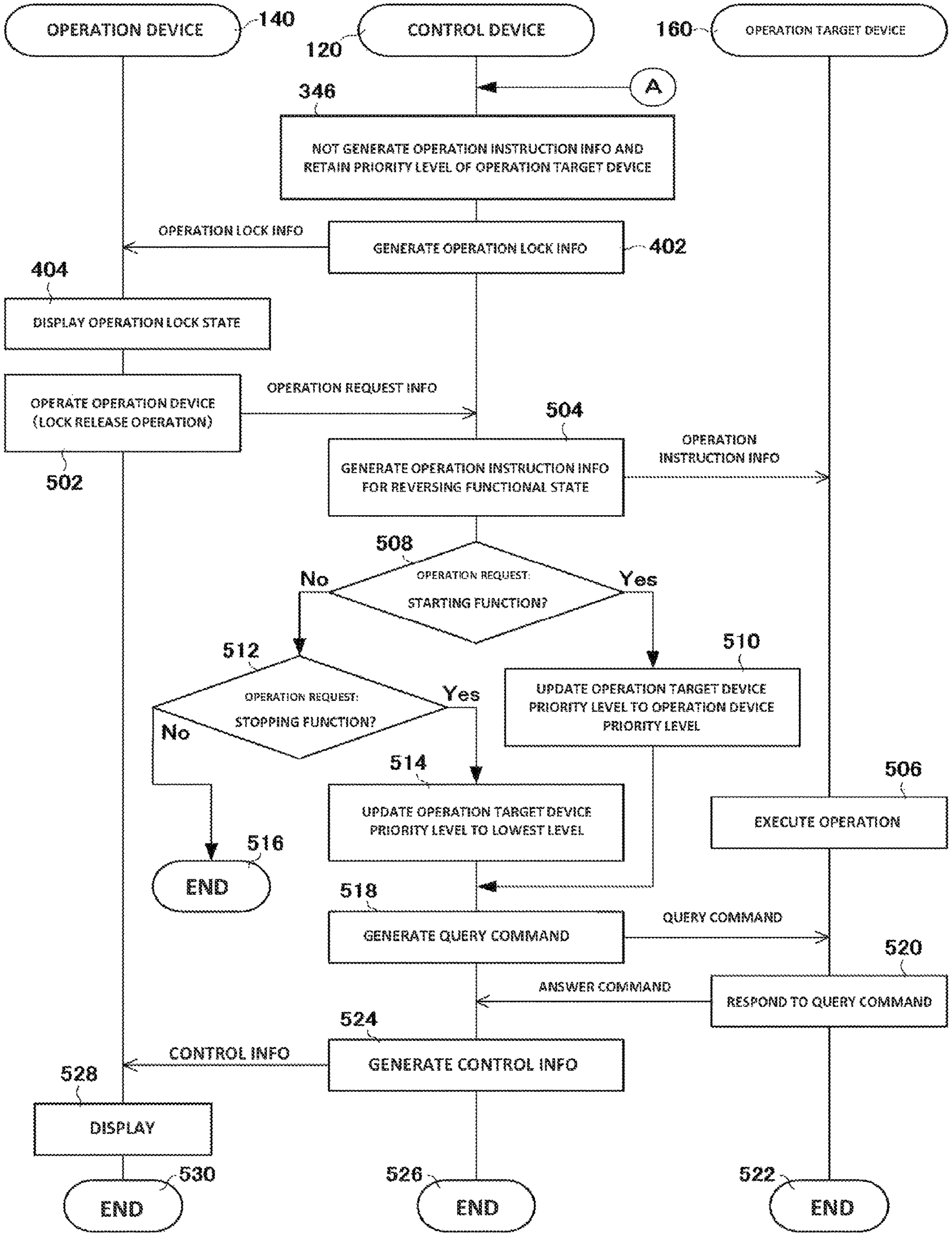
FIG. 11 is a flowchart illustrating an example of behavior of the priority control system 100.

It should be noted that if the operation device 140 is in the operation lock state, it is possible to operate the operation device 140 to release the locked state. That is, as illustrated in FIG. 11, operation defined in advance is executed as lock release operation to the operation device 140 in the operation lock state (step 502). The lock release operation may be exemplified by, for example, holding down operation of a button switch, repeating operation of turning on and off in a short time. The operation device 140 subjected to the lock release operation sends operation request information including the effect of lock releasing to the control device 120 and the control device 120 having received the information generates operation instruction information to the effect of reversing the functional state of the operation target device (e.g., in the case of a lighting device, turns on the device in the light out state or turns off the device in the lighting state) (step 504) and sends the information to the operation target device 160. Then, if receiving the operation request (operation instruction) of starting (step 508), the control device 120 updates the priority level of the operation target device 160 to the priority level of the operation device (step 510), or if receiving the operation request (operation instruction) of stopping (step 512), updates the priority level of the operation target device 160 to the lowest level (step 514). Meanwhile, the operation target device 160 subjected to the operation instruction information executes the operation (step 506). The process of steps 518 through 530 is the same as the process of steps 332 through 344. Such process allows the operation device 140 to readily release the operation lock state.

The present invention has been described by way of embodiments while the technical scope of the present invention is not limited to the scope of the embodiments described above. The persons skilled in the art clearly understand that the above embodiments may be variously altered or improved. It is clearly understood from the description of the appended claims that the embodiments subjected to such an alteration and improvement may also be included in the technical scope of the present invention.

Figure 12:
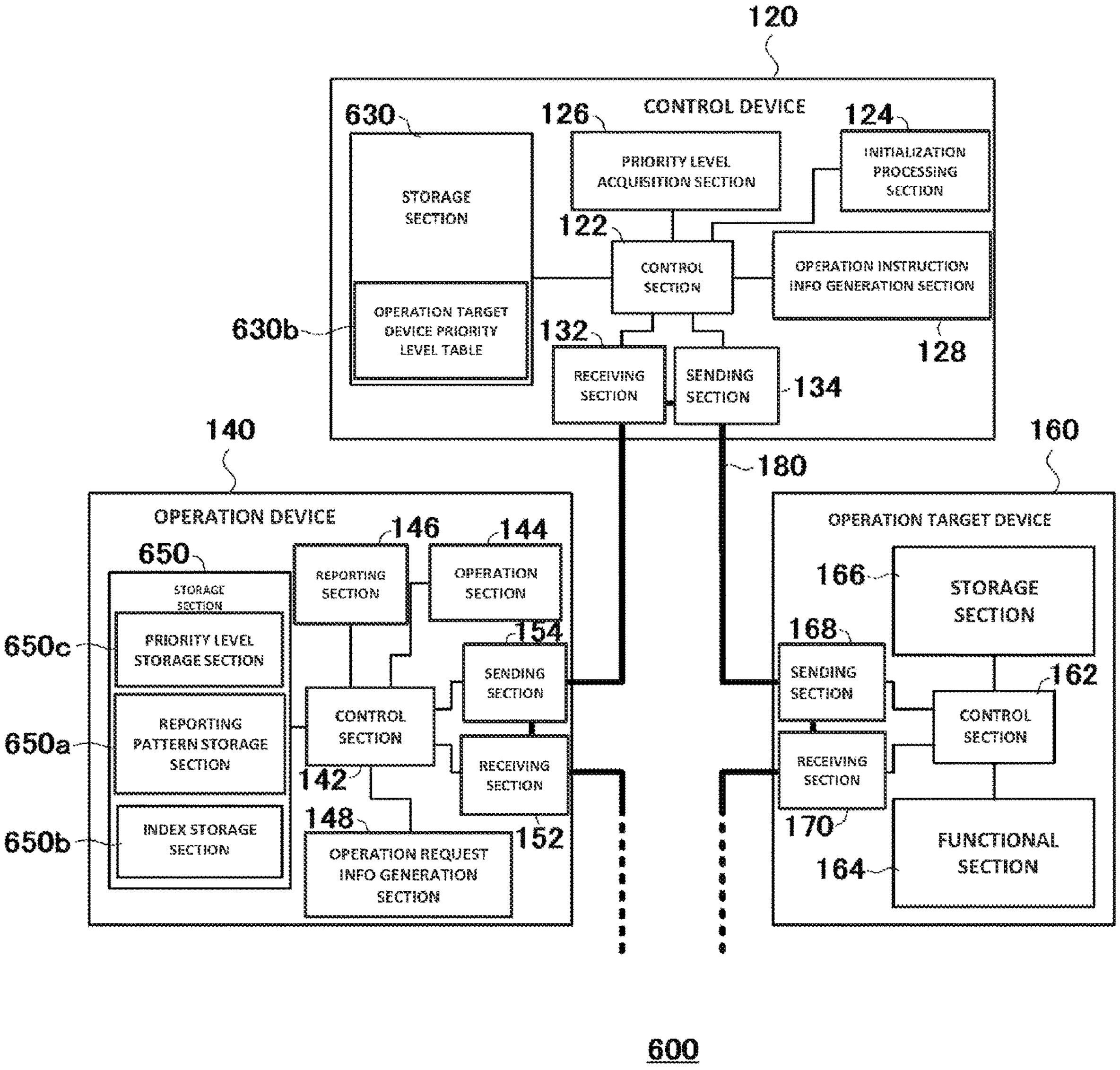
FIG. 12 is a functional block diagram illustrating the main configuration of a priority control system 600.
Figure 13:
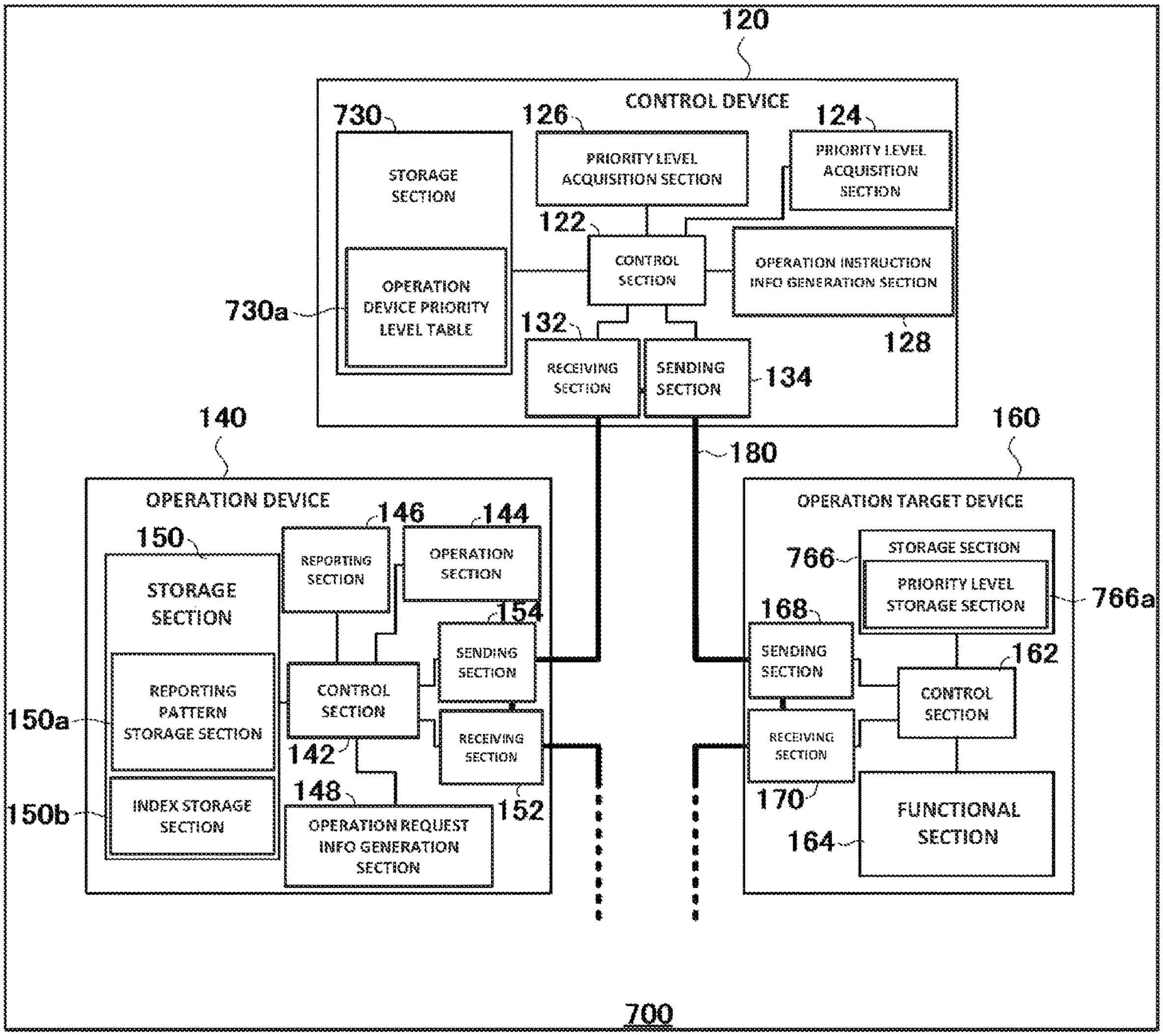
FIG. 13 is a functional block diagram illustrating the main configuration of a priority control system 700.
Figure 14:
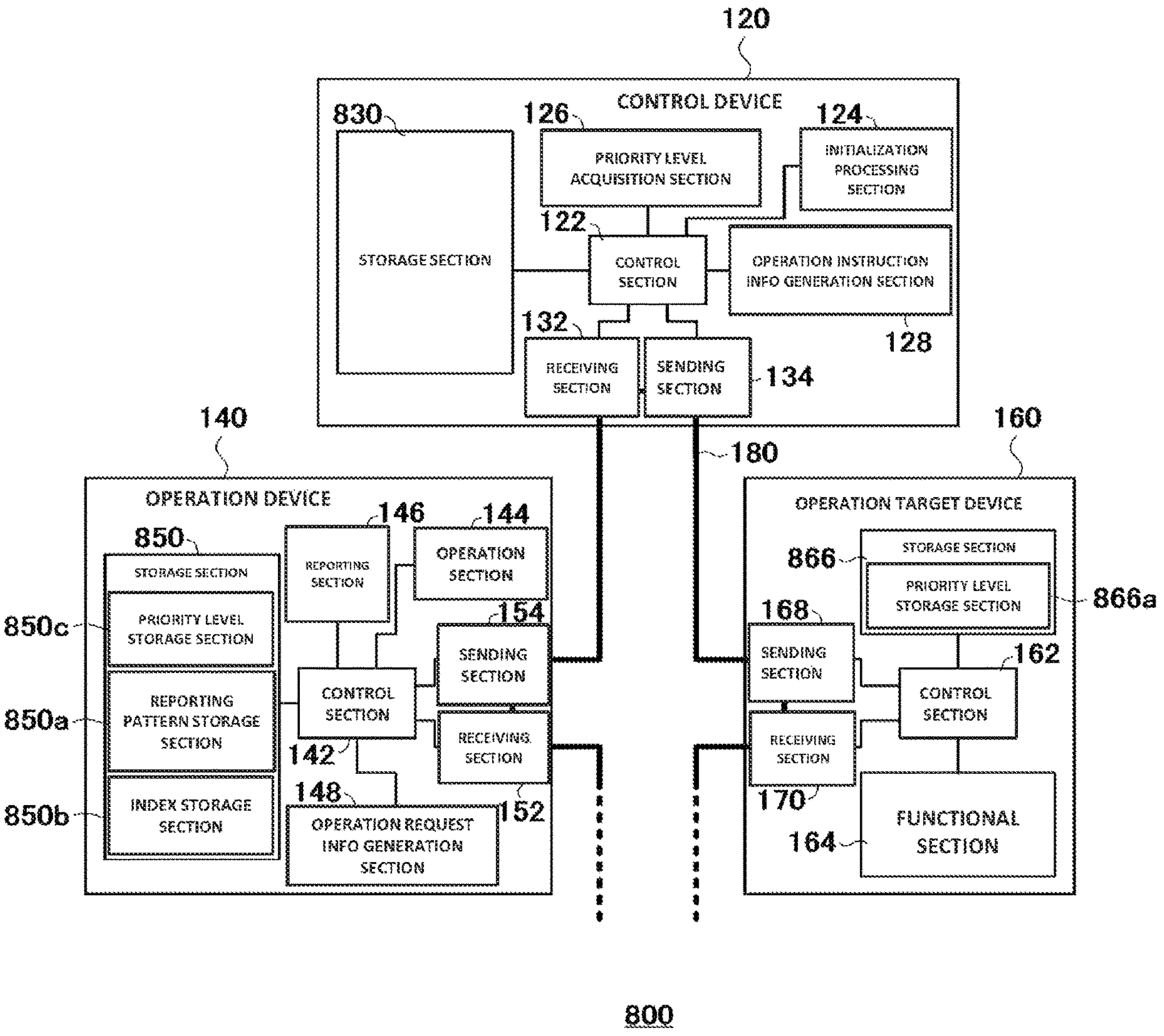
FIG. 14 is a functional block diagram illustrating the main configuration of a priority control system 800.

For example, in the above embodiments, an example is described where both the operation device priority level and the operation target device priority level are stored in the storage section 130 of the control device 120. However, as illustrated in FIG. 12, the priority level (operation device priority level) of each operation device may be stored in a storage section 650 of the respective operation device 140 and the operation target device priority level may be stored in a storage section 630 of the control device 120. As another example, as illustrated in FIG. 13, the priority level (operation target device priority level) of each operation target device may be stored in a storage section 766 of the respective operation target device 160 and the operation device priority level may be stored in a storage section 730 of the control device 120. As still another example, as illustrated in FIG. 14, the priority level (operation device priority level) of each operation device may be stored in a storage section 850 of the respective operation device 140 and the priority level (operation target device priority level) of each operation target device may be stored in a storage section 866 of the respective operation target device 160.

In addition, although the idea according to the invention of the present disclosure is described as the priority control system in the above embodiments, the idea may be understood as a priority control device. That is, the idea may be understood as a priority control device including: a receiving section 132 configured to receive operation request information to effect of causing a single or plurality of operation target devices 160 to exhibit a function from a plurality of operation devices 140; a sending section 134 configured to send operation instruction information to effect of exhibiting the function to the operation target device 160; a priority level acquisition section 126 configured to acquire an operation device priority level specifically set to each operation device 140 and a dynamically variable operation target device priority level set to the operation target device 160; and a control section 122 configured to refer to the operation device priority level of an operation device 140 originating the operation request information and the operation target device priority level of a destination operation target device 160 for the operation request information triggered by the reception of the operation request information, and as a result of the reference, to generate or not to generate the operation instruction information and to retain or update the operation target device priority level.

Still in addition, the idea according to the invention of the present disclosure may be understood as an operation device. That is, the idea may be understood as an operation device including: an operation section 144; a reporting section 146 configured to perform light emission display, image display, sound generation, vibration generation, or another report; an operation request information generation section 148 configured to generate operation request information to effect of causing an operation target device 160 to exhibit a function of the operation target device 160 triggered by operation of the operation section 144; a sending section 154 configured to send the operation request information; a receiving section 152 configured to receive response information to respond to the operation request information or control information sent from a control device 120 having received the operation request information; and a control section 142 configured to control the reporting section 146 based on report control information contained in the response information or the control information.

Still in addition, the process of controlling using the operation device priority level and the operation target device priority level is described in the above embodiments while it is also possible to set an attribute code classified by an installation location, an intended use, and another attribute, in addition to the operation device priority level, of each operation device 140 and to control using them. That is, the control device 120 may refer to the operation target device priority level and a combination of the attribute code with the operation device priority level, and as a result of the reference, generate or not generate the operation instruction information and retain or update the operation target device priority level. The combination of the operation device priority level with the attribute code allows various kinds of control to provide a more convenient system to users.

REFERENCE SIGNS LIST

100: Priority Control System, 112: Light Setting Rule, 120: Control Device, 122: Control Section, 124: Initialization Processing Section, 126: Priority Level Acquisition Section, 128: Operation Instruction Information Generation Section, 130: Storage Section, 130*a*: Operation Device Priority Level Table, 130*b*: Operation Target Device Priority Level Table, 132: Receiving Section, 134: Sending Section, 140: Operation Device, 142: Control Section, 144: Operation Section, 146: Reporting Section, 148: Operation Request Information Generation Section, 150: Storage Section, 150*a*: Reporting Pattern Storage Section, 150*b*: Index Storage Section, 152: Receiving Section, 154: Sending Section, 160: Operation Target Device, 162: Control Section, 164: Functional Section, 166: Storage Section, 168: Sending Section, 170: Receiving Section, 180: Communication Mechanism, 200: Hardware, 202: Data Bus, 204: CPU, 206: Input Device, 208: Output Device, 210: Input And Output Device, 212: Storage Device, 220: Microcomputer, 230: Command Generation Section, 232: Command Analysis Section, 234: User Program, 236: Memory Section, 600: Priority Control System, 650: Storage Section, 700: Priority Control System, 766: Storage Section, 800: Priority Control System, 850: Storage Section, 866: Storage Section.

The invention claimed is:

1. A priority control system for an operation target device, comprising:

a plurality of operation devices configured to send operation request information designed to cause an operation target device to perform an action;

a single or plurality of operation target devices configured to receive operation instruction information and to perform an action in response to the operation instruction information;

a control device configured to receive the operation request information from at least one of the operation devices, to generate or not to generate the operation instruction information triggered by the reception of the operation request information, and, if the operation instruction information is generated, to send the generated operation instruction information to at least one of the operation target devices; and a communication mechanism configured to communicate the operation request information and the operation instruction information, wherein a specific operation device priority level is set to each operation device, wherein a dynamically variable operation target device priority level is set to the operation target device, wherein the control device is configured to refer to the operation device priority level and the operation target device priority level, and as a result of the reference, to generate or not to generate the operation instruction information and to retain or update the operation target device priority level wherein the control device is configured to determine whether the operation target device priority level is higher than the operation device priority level in response to the reception of the operation request information and, if the determination is true, to retain the operation target device priority level without generating the operation instruction information, and wherein the control device is configured to determine whether the operation request information is intended to stop the function of the operation target device and to determine whether the operation target device priority level is equal to or less than the operation device priority level, and, if the determinations are true, to generate the operation instruction information intended to stop the function and to update the operation target device priority level to a lowest level.

2. The priority control system according to claim 1, wherein the control device determines, in response to the reception of the operation request information, whether the operation request information is information designed to cause an operation target device to perform an action and whether the operation target device priority level is equal to the operation device priority level or less, and if the determinations are true, generates the operation instruction information and updates the operation target device priority level to be equal to the operation device priority level.

3. The priority control system according to claim 1, wherein the control device is configured to determine whether the operation request information is intended to stop the function of the operation target device, to maintain the priority level of the operation target device, and whether the operation target device priority level is equal to or less than the operation device priority level, and if the determinations are true, to generate the operation instruction information intended to stop the function and to update the operation target device priority level to the operation device priority level.

4. The priority control system according to claim 1, wherein each operation device has a reporting section configured to report that the operation device is in an operation lock state where operation is ignored, the control device is configured to determine whether the operation target device priority level is higher than the operation device priority level in response to the reception of the operation request information, and if the determination is true, to send operation lock information designed to inform the operation device having sent the operation request information that the action could not be performed, and the reporting section is further configured to report that the operation device is in the operation lock state when the operation device receives the operation lock information.

5. The priority control system according to claim 4, wherein, while the reporting section of the operation device is configured to report that the operation device is in the operation lock state, the operation device is configured to send operation request information containing information designed to cause the control device to release the operation device from the operation lock state to the control device in response to a user input, and wherein the control device is configured to generate operation instruction information designed to cause a reversal a current state of the action in response to the reception of the operation request information.

6. The priority control system according to claim 5, wherein the operation target device priority level is updated to the operation device priority level if the operation instruction information is designed to cause an action to be performed, and the operation target device priority level is updated to a lowest level if the operation instruction information is designed to stop an action from being performed.

7. The priority control system according to claim 1, wherein the system has any configuration of:

a first configuration in which each operation device has a storage section configured to store the operation device priority level, each storage section stores the operation device priority level specific to the operation device, the operation target device has a storage section configured to store the operation target device priority level, and the operation target device priority level is stored and updated in the storage section;

a second configuration in which each operation device has a storage section configured to store the operation device priority level, each storage section stores the operation device priority level specific to the operation device, the control device has a storage section configured to store the operation target device priority level, and the operation target device priority level is stored and updated in the storage section;

a third configuration in which the control device has a storage section configured to store each operation device priority level, the storage section stores the operation device priority level specific to each operation device, the operation target device has a storage section configured to store the operation target device priority level, and the operation target device priority level is stored and updated in the storage section; and a fourth configuration in which the control device has a storage section configured to store each operation device priority level and the operation target device priority level, the storage section stores the operation device priority level specific to each operation device, and the operation target device priority level is stored and updated in the storage section.

8. The priority control system according to claim 1, wherein an attribute code classified by an installation location, an intended use, and another attribute, in addition to the operation device priority level, of each operation device is set to the operation device, and the control device is configured to refer to the operation target device priority level and a combination of the attribute code with the operation device priority level, and as a result of the reference, to generate or not to generate the operation instruction information and to retain or update the operation target device priority level.

9. The priority control system according to claim 1, wherein the operation target device is a lighting device, the operation devices are remote operation devices for the lighting device, and the operation request information and the operation instruction information are configured with a command in accordance with DALI (digital addressable lighting interface)® standard.

10. A priority control device for an operation target device, comprising:

a receiving section configured to receive operation request information from a plurality of operation devices, wherein the operation request information is configured to cause a single or plurality of operation target devices to perform an action;

a sending section configured to send operation instruction information to at least one operation target device, wherein the operation instruction information is configured to cause the operation target device to perform the action;

a priority level acquisition section configured to acquire an operation device priority level specifically set to each operation device and a dynamically variable operation target device priority level set to the operation target device; and a control section configured to refer to the operation device priority level of an operation device originating the operation request information and the operation target device priority level of a destination operation target device for the operation request information triggered by the reception of the operation request information, and as a result of the reference, to generate or not to generate the operation instruction information and to retain or update the operation target device priority level, wherein the control device is configured to determine whether the operation target device priority level is higher than the operation device priority level in response to the reception of the operation request information and, if the determination is true, to retain the operation target device priority level without generating the operation instruction information, and wherein the control device is configured to determine whether the operation request information is intended to stop the function of the operation target device and to determine whether the operation target device priority level is equal to or less than the operation device priority level, and, if the determinations are true, to generate the operation instruction information intended to stop the function the function and to update the operation target device priority level to a lowest level.

11. The priority control device according to claim 10, wherein the priority level acquisition section has any configuration of:

a first configuration to read and acquire each operation device priority level and the operation target device priority level from a storage section provided in the priority control device;

a second configuration to read each operation device priority level from the storage section and to acquire the operation target device priority level from the operation target device via a communication mechanism;

a third configuration to acquire the operation device priority level from each operation device via the communication mechanism and to read and acquire the operation target device priority level from the storage section; and a fourth configuration to acquire the operation device priority level from each operation device via the communication mechanism and to acquire the operation target device priority level from the operation target device via the communication mechanism.

12. The priority control device according to claim 10, wherein an attribute code classified by an installation location, an intended use, and another attribute, in addition to the operation device priority level, of each operation device is set to the operation device, and the control section is configured to refer to the attribute code and the operation device priority level of the operation device originating the operation request information and the operation target device priority level of the destination operation target device for the operation request information once triggered by the reception of the operation request information, and, as a result of the reference, determine whether or not to generate the operation instruction information and to retain or update the operation target device priority level.

13. The priority control device according to claim 10, wherein the operation target device is a lighting device, the operation devices are remote operation devices for the lighting device, and the operation request information and the operation instruction information are configured with a command in accordance with DALI (digital addressable lighting interface)® standard.

14. The priority control system for an operation target device according to claim 1, wherein the operation target device comprises:

an operation section;

a reporting section comprising a light emission display, an image display, a sound generation apparatus, or a vibration generation apparatus;

an operation request information generation section configured to generate operation request information configured to cause an operation target device to perform an action when triggered by operation of the operation section;

a sending section configured to send the operation request information;

a receiving section configured to receive response information to respond to the operation request information or control information sent from a control device having received the operation request information; and a control section, wherein the control section is configured to control the reporting section based on report control information contained in the response information or the control information.

15. The priority control system for an operation target device according to claim 14, the priority control system further comprising a storage section including a reporting pattern storage section configured to store a single or plurality of reporting patterns and an index storage section configured to store an index associated with each reporting pattern, wherein the control section is configured to generate the index referring to the report control information if the receiving section has received the response information or the control information, to write the index in the index storage section, and to control the reporting section in accordance with the reporting pattern associated with the index stored in the index storage section.

16. The priority control system for an operation target device according to claim 14, wherein, if the response information contains operation lock information configured to cause an operation target device not to perform an action, the control section is configured to control the reporting section to report that the operation device is in an operation lock state where the operation is ignored.

17. The priority control system for an operation target device according to claim 16, wherein while the reporting section reports that the operation device is in the operation lock state, the operation request information generation section is configured to generate the operation request information containing information configured to cause the operation lock state to be released.

18. The priority control system for an operation target device according to claim 14, wherein the operation device is capable of remote operation for a lighting device, the operation target device is a lighting device, and the operation request information, the response information, and the control information are configured with a command in accordance with DALI (digital addressable lighting interface)® standard.

* * * * *